United States Patent [19]

Kloker

[11] Patent Number: 4,744,043

[45] Date of Patent: May 10, 1988

[54] DATA PROCESSOR EXECUTION UNIT WHICH RECEIVES DATA WITH REDUCED INSTRUCTION OVERHEAD

[75] Inventor: Kevin L. Kloker, Arlington Heights, Ill.

[73] Assignee: Motorola, Inc., Schaumburg, Ill.

[21] Appl. No.: 715,863

[22] Filed: Mar. 25, 1985

[51] Int. Cl.$^4$ .......................... G06F 7/38; G06F 7/72
[52] U.S. Cl. .................................... 364/736; 364/746
[58] Field of Search .......................... 364/736, 716, 746

[56] References Cited

U.S. PATENT DOCUMENTS

| | | |
|---|---|---|
| 3,909,789 | 9/1975 | Holtey et al. ........................ 364/716 |
| 4,121,298 | 10/1978 | Akushsky et al. .................. 364/746 |
| 4,384,340 | 5/1983 | Tague et al. ......................... 364/736 |

OTHER PUBLICATIONS

"DSP Microprocessor ADSP-2100" pp. 1-35 Analog Devices, Digital Signal Processing Division, Norwood, MA Aug. 1986.
"Modular Arithmetic . . . An Ancient Science for a New Computer" *Westinghouse Engineer* vol. 23, No. 4, Jul. 1963 pp. 112-114.

*Primary Examiner*—David H. Malzahn
*Attorney, Agent, or Firm*—John A. Fisher; Jeffrey Van Myers; Robert L. King

[57] ABSTRACT

A data processor execution unit is provided for coupling multiple operands to an AU in response to an operand selection portion of an instruction supplied from an instruction register. At least two operands are provided from two pluralities of registers, respectively. Additionally, a predetermined one of the operands contains encoded information for selecting one of a plurality of arithmetic operations which the AU performs. The operand containing the encoded information is coupled to an AU control decoder for use in controlling the operation of the AU. In one form, a single operand selection portion of an instruction selects a plurality of registers containing operands which the AU may utilize. In another form, one of the operands contains encoded information for use in selecting arithmetic formats of the AU.

13 Claims, 1 Drawing Sheet

DATA PROCESSOR EXECUTION UNIT WHICH RECEIVES DATA WITH REDUCED INSTRUCTION OVERHEAD

CROSS REFERENCE TO RELATED APPLICATIONS

1. U.S. application Ser. No. 715,864, entitled, "A Modulo Arithmetic Unit Having Arbitrary Offset And Modulo Values", filed simultaneously herewith by Kevin Kloker et al.

2. U.S. application Ser. No. 715,865, entitled, "Method And Apparatus for Implementing Modulo Arithmetic Calculations", filed simultaneously herewith by Tim Williams.

TECHNICAL FIELD

This invention relates generally to data processors, and more particularly, to data processor execution units which provide multiple arithmetic formats.

BACKGROUND ART

Data processors typically utilize instruction sets for specifying various functions to be performed by a data execution unit. One form of instruction commonly comprises two fields in which a first field specifies at least one operand register location and a second field specifies an execution unit operation, such as increment or decrement, to be performed on the selected operands. An example of an execution unit of a data process which utilizes a conventional instruction set is taught in U.S. Pat. No. 4,296,469 entitled "Execution Unit for Data Processor Using Segmented Bus Structure" by Gunter et al. However, previous known execution units operate in only one arithmetic format, such as conventional linear arithmetic. Conventional linear arithmetic is typically implemented in data processors using two's complement binary arithmetic. In order for other arithmetic formats to be used, such as modulo arithmetic, additional fields in the instruction set are required to specify the arithmetic format of each operand. The data execution unit must also be informed how to process the particular arithmetic format of each data operand. Therefore, additional fields in the instruction must be decoded to control the arithmetic format of the data execution unit.

Typically, data processors use multiple arithmetic formats in data execution units. A typical data processor provides instructions for processing data in a linear arithmetic format or in a binary coded decimal (BCD) arithmetic format. However, additional instructions are required to implement this capability. Therefore, previous processors which have implemented various arithmetic formats have the disadvantages of either using additional instruction bits (wider instructions) or using an increased number of instructions. Unfortunately, additional instruction bits are not always available and expansion of the instruction set is typically limited. Limited instruction expansion results from near capacity utilization of the existing instruction set.

Others have also provided for varying arithmetic formats by using additional bits in each data operand to specify the type of arithmetic format. However, the size of each data operand is increased, and the number of bits available as data is decreased. Therefore, the arithmetic format information is data dependent, and the data operand is limited to being processed in only one arithmetic format.

SUMMARY OF THE INVENTION

Accordingly, an object of the present invention is to provide an improved data processor execution unit.

Another object of the present invention is to provide an improved data processor execution unit having an arithmetic unit which operates in various arithmetic formats.

Yet another object of the present invention is to minimize instruction overhead and optimize data operand size in a data processor execution unit which performs calculations in a plurality of arithmetic formats.

Yet a further object of the present invention is to provide an improved data processor execution unit which operates in various arithmetic formats and uses format control mechanisms which are independent of the data operands.

In carrying out the above and other objects, there is provided, in one form, a data processor having an arithmetic unit (AU) for performing predetermined operations on selected operands and providing a resultant. A first storage device provides first operands to the arithmetic unit in response to a first operand selection portion of the instruction. A second storage device selectively provides second operands to the AU and to an arithmetic unit control also in response to the first operand selection portion of the instruction. The arithmetic unit control is provided for selecting the operation to be performed by the AU in response to either or both an operation portion of an instruction or the second operand. In one form, a third storage device provides a third operand to the AU also in response to the first operand selection portion of the instruction. The second operand is capable of causing the AU to select the arithmetic format of the AU operation. In another form, the AU performs arithmetic operations on first and third operands modulo the second operand. In yet another form, the first, second and third operands are provided in response to first, second and third operand selection portions of the instruction, respectively. The above and other objects, features and advantages will be more clearly understood from the following detailed description taken in conjunction with the accompanying drawings.

DETAILED DESCRIPTION OF THE INVENTION

Figure 1:
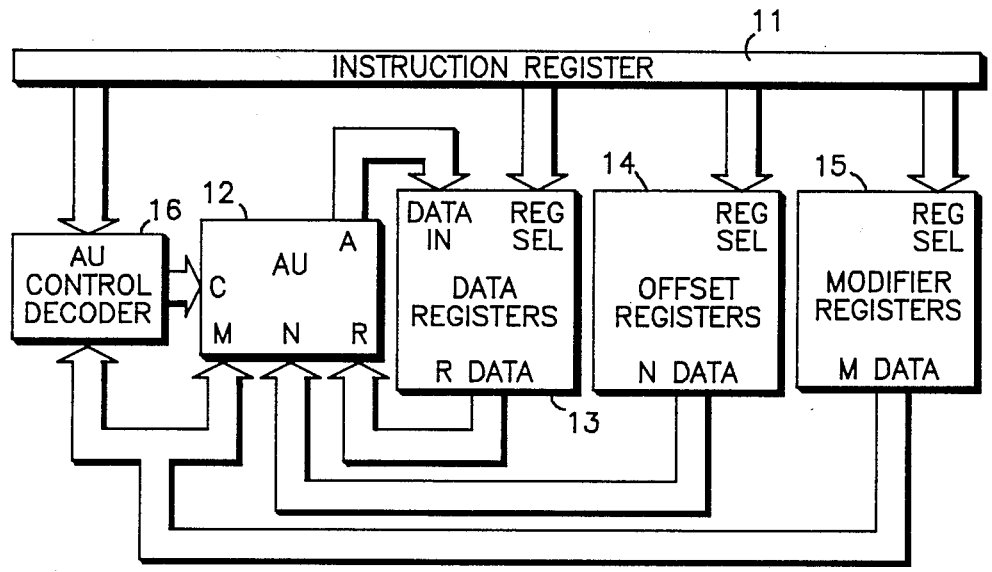
FIG. 1 illustrates in block diagram form a data processor execution unit in accordance with the present invention.

Shown in FIG. 1 is a data processor execution unit 10 generally comprising an instruction register 11, an arithmetic unit (AU) 12, a first plurality of registers labeled data registers 13, a second plurality of registers labeled modifier registers 15, a third plurality of registers labeled offset registers 14, and an AU control decoder 16. Data registers 13, offset registers 14 and modifier registers 15 each have a register select control input labeled "Reg Sel" connected to instruction register 11. Data registers 13 have an output labeled "R Data" connected to a first data input of AU 12 labeled "R". Offset registers 14 have an output labeled "N Data" connected to a second data input of AU 12 labeled "N". Modifier registers 15 have an output labeled "M Data" connected to both a third data input of AU 12 labeled "M" and to a first input of AU control decoder 16. An output of AU 12 labeled "A" is connected to a data input of data registers 13. While an AU is provided, it should be apparent that the present invention may also be implemented with an arithmetic logic unit (ALU). It should also be readily apparent that the present invention may be implemented with any type of registers or any type of storage means besides registers, such as, for example, RAMs, ROMs or PLAs. Instruction register 11 is also connected to a second input of AU control decoder 16. An output of AU control decoder 16 is connected to a control input of AU 12 labeled "C".

In operation, data processor execution unit 10 may perform arithmetic calculations in varying arithmetic formats, such as linear, modulo, BCD, bit reverse, floating point or any other desired format, without increasing the bit size of the control field or operand selection portion of an instruction in instruction register 11. By way of example only, assume that execution unit 10 is implemented to perform addressing calculations. However, it should be readily understood that execution unit 10 is not limited to address arithmetic applications. Further assume, for the purpose of illustration only, that an AU such as the AU taught in my copending U.S. application Ser. No. 715,864, entitled "A Modulo Arithmetic Unit Having Arbitrary Offset And Modulo Values" and herein incorporated by reference, is used as AU 12. It should also be readily apparent that any type of an AU may be used to implement the present invention. In the specific application enumerated, the M input of AU 12 corresponds to a modulus value, the R input corresponds to an address value, and the N input corresponds to an offset or another data value. Data registers 13 provide a storage device for storing data values R which are selectively coupled to AU 12 in response to a first predetermined operand selection field of an instruction of instruction register 11 which is illustrated as the register select signal. Similarly, offset registers 14 provide a storage device for data values N which are selectively coupled to AU 12 in response to a third predetermined operand selection field of an instruction from instruction register 11.

In the illustrated form, a major advantage provided by the present invention is the use of the plurality of modifier registers 15 to provide information to both AU 12 and AU control decoder 16. The information stored in modifier registers 15 is encoded with a value which determines the arithmetic format to be used by AU 12 in arithmetic calculations, such as linear or modulo formats. Therefore, modifier registers 15 may modify the arithmetic format of AU 12 in response to a second predetermined operand selection field of an instruction in instruction register 11. In the example illustrated, the M data in modifier registers 15 identify the type of data structure in external memory (not shown) that a predetermined one of the data registers in registers 13 or 14 is referencing. In addition, the encoded information or a portion thereof provided by modifier registers 15 may be used as data by AU 12.

In the illustrated form of the arithmetic unit taught in my copending patent application, serial number 06/715,864, modifier registers 15 provide control information to AU control 16 and also provide additional parameters which might be required in a particular type of arithmetic format. The R data in data registers 13 may be selectively updated or modified by replacing the R data with the calculated output values A of AU 12. An advantage provided by the present invention over known execution units is the fact that the arithmetic format which is used by AU 12 may be easily varied without adding additional bits to the instruction in instruction register 11. AU control decoder 16 comprises conventional decoder circuitry which decodes either or both the operation portion of instruction register 11 and the M data value, or a portion thereof, from the selected modifier register 15. An example of control circuitry required to implement a portion of AU control decoder 16 which decodes the M data value is shown in FIG. 4 of my copending patent application, serial number 06/715,864, which teaches how a predetermined plurality of modulo bits, $M_x$, decodes to a plurality of control signals for arithmetic unit 12. In addition to receiving an encoded arithmetic format data value from modifier registers 15, AU control decoder 16 also receives an operation portion of an instruction from instruction register 11. The operation portion of the instruction controls the type of arithmetic operation of AU 12, such as increment or decrement, as contrasted with the format of arithmetic used. It should be readily understood that decoder 16 may be implemented in numerous other ways using conventional decoder circuitry. It should also be understood that the present invention may also be practised without the use of an operation portion of an instruction connected to AU control decoder 16. If instruction register 11 is not connected to AU control decoder 16, AU control decoder 16 may still decode control information from modifier registers 15 to provide control signals to AU 12.

In the illustrated form, extensions may be easily incorporated into modifier registers 15 to allow various types of arithmetic formats to be implemented. For example, shown in Table One below is a plurality of illustrated modifier codes which may be stored in modifier registers 15, each of which corresponds to a predetermined arithmetic format.

TABLE One

| Modifier MMMMMMMMMMMMMMMM | Arithmetic Format |
|---|---|
| 0000000000000000 | Bit Reversed |
| 0000000000000001 | Modulo 2 |
| 0000000000000010 | Modulo 3 |
| 0000000000000011 | Modulo 4 |
| . | . |
| . | . |
| . | . |
| 0111111111111110 | Modulo 32767 |
| 0111111111111111 | Modulo 32768 |
| 1000000000000000 | Reserved |
| . | . |
| . | . |
| . | . |
| 1111111111111110 | Linear (Modulo 65536) |
| 1111111111111111 | |

Although a specific bit size and encoding is illustrated in Table One, it should be apparent that the present invention may be implemented with any bit size or encoding. In addition, predetermined modifier codes may be reserved so that extensions on arithmetic formats may be easily added for future applications as needed. A reduction of instruction register complexity results from the use of a modifier register which is decoded to determine what type of arithmetic format an AU uses. Additional flexibility of an execution unit is also provided without having to modify circuitry. It should also be readily understood that the invention may be practised without using the data in modifier registers 15 as an additional parameter for AU 16.

An important aspect of the present invention is the capability to specify a variety of arithmetic formats without using additional data bits of the data operand. Because the arithmetic format is encoded as data in the modifier registers 15, the arithmetic format is independent of the data values stored in registers 13 and 14. Further, since the arithmetic format information is data independent, an additional level of flexibility is provided when using multiple data formats. For example, multiple arithmetic formats may be used with the same data. As a further example, multiple data items may be used with the same arithmetic format stored in a predetermined one of modifier registers 15. In addition, some arithmetic formats which an AU may be capable of performing, such as modulo, may use the modifier data, or a portion thereof, in modifier registers 15 as additional data parameters for AU 12. The arithmetic format and any optional parameters required by AU 12 may be encoded together in modifier registers 15. Therefore, a large amount of processing flexibility with respect to arithmetic formats requiring additional parameters has been provided without sacrificing instruction and data sizes.

Even in applications in which only linear arithmetic is desired, the present invention is faster and more efficient than known execution units because more than one parameter may be addressed for use by AU 12 by a single operand selection portion of an instruction from instruction register 11. For example, the present invention may be modified so that execution unit 10 comprises a plurality of registers which are each controlled by a single operand control field of an instruction from instruction register 11.

Figure 2:
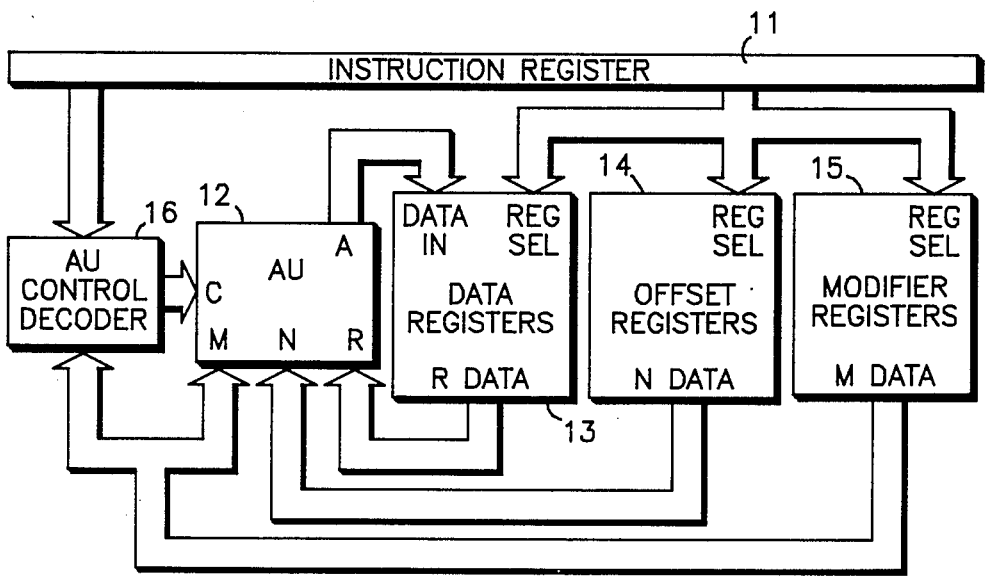
FIG. 2 illustrates in block diagram form another embodiment of a data processor execution unit in accordance with the present invention.

Shown in FIG. 2 is a variation of execution unit 10 of FIG. 1 in which an execution unit 10' comprises substantially the same components in block diagram form as execution unit 10 and illustrated by the same numbers. However, in the modified form, the register selection inputs of data registers 13, offset registers 14 and modifier registers 15 are all connected together and connected to the same operand selection portion of an instruction from instruction register 11. Therefore, the same register selection means is used for registers 13, 14 and 15. Even if variable control of the arithmetic format in AU 12 was not desired and registers 15 were not present, a plurality of predetermined operands may be coupled from registers 13 and 14 to respective inputs of AU 12 in response to a single operand selection portion of an instruction. This is accomplished by pairing predetermined register locations in registers 13 and 14 with the same operand selection field of an instruction. Previously, a separate operand selection field was required to address each operand in a register for coupling an operand to an AU. Therefore, the present invention optimizes instruction utilization without sacrificing execution speed to provide multiple operands to an AU for processing.

It should also be readily apparent that other types of AUs or ALUs may be used with the invention as illustrated in FIGS. 1 and 2 by using singular or multiple busses. If so desired, an additional processor or processors may be coupled to any of registers 13, 14 and 15 by coupling busses associated with such additional processors to any of registers 13, 14 and 15.

While embodiments have been taught using particular types of AUs, decoders and data registers, it should be understood that certain obvious modifications to the circuit or the associated parameters will become apparent to those skilled in the art, and the scope of the invention should be limited only by the scope of the claims appended hereto.

I claim:

1. A data execution unit comprising:
an arithmetic unit (AU) for performing selected operations on first and second operands in one of a plurality of arithmetic formats and providing a resultant thereof;
an arithmetic unit control coupled to the arithmetic unit for selectively controlling the operation to be performed by said AU;
first means for providing said first operand to said arithmetic unit in response to an operand selection portion of an instruction;
second means for providing the second operand to said arithmetic unit, said second means providing the second operand to said arithmetic unit in response to the same operand selection portion of the instruction; and
third means for providing a third operand to said arithmetic unit in response to the same operand selection portion of the instruction, said third operand being used by the arithmetic unit control to select one of the plurality of arithmetic formats.

2. The data execution unit of claim 1 further comprising means for coupling the second means to the arithmetic unit control so that the second operand is also coupled to the arithmetic unit control in response to the same operand selection portion of the instruction, said second operand being used by the arithmetic unit control for selectively controlling, either solely or in combination with an operation portion of the instruction, the operation to be performed by said AU.

3. The data execution unit of claim 2 wherein the AU performs arithmetic operations on the first and third operands modulo the second operand.

4. The data execution unit of claim 2 wherein the first, second and third means each comprises a predetermined plurality of registers for storing the first, second and third operands, respectively.

5. A data execution unit comprising:
an arithmetic unit (AU) for performing selected operations on first and second operands in one of a plurality of arithmetic formats and providing a resultant thereof;
an arithmetic unit control coupled to the arithmetic unit for selectively controlling the operation to be performed by said AU;
first means coupled to the arithmetic unit for providing said first operand to said arithmetic unit in response to an operand selection portion of an instruction;
second means coupled to the arithmetic unit for providing said second operand; and
third means coupled to the arithmetic unit control for coupling a third operand to said arithmetic unit control in response to the operand selection portion of the instruction, said third operand selecting the arithmetic format of the arithmetic unit.

6. The data execution unit of claim 5 wherein the third means is further coupled to the arithmetic unit for also coupling the third operand to the arithmetic unit, said third operand being utilized by the arithmetic unit as a data operand in said selected operations.

7. A data execution unit comprising:
an arithmetic unit (AU) for performing a selected arithmetic operation on first and second operands in one of a plurality of arithmetic formats and providing a resultant thereof;
an arithmetic unit control for selecting an arithmetic operation to be performed by said AU in response to an operation portion of an instruction;
first means coupled to the arithmetic unit for providing the first operand to said arithmetic unit in response to a first operand selection portion of the instruction; and
second means coupled to the arithmetic unit for providing the second operand in response to a second operand selection portion of the instruction; and
third means coupled to the arithmetic unit control for providing a third operand in response to a third operand selection portion of the instruction, the third operand being used by the arithmetic unit control to select one of the plurality of arithmetic formats in which to execute the selected arithmetic operation.

8. The data execution unit of claim 7 further comprising means for coupling the third means to the arithmetic unit for selectively transmitting the third operand to the arithmetic unit in response to the third operand selection portion of the instruction.

9. The data execution unit of claim 8 wherein the first, second and third operand selection portions of the instruction are substantially the same portion of the instruction, thereby decreasing the size of the instruction.

10. The data execution unit of claim 8 wherein the AU performs arithmetic operations on first and second operands modulo the third operand.

11. The data execution unit of claim 8 wherein the first, second and third means each comprise a predetermined plurality of registers for storing said first, second and third operands, respectively.

12. In a data execution unit having an arithmetic unit (AU) for performing selected operations on first and second operands in one of a plurality of arithmetic formats in response to an arithmetic unit control and providing a resultant thereof, a method of selecting the arithmetic format in the AU, comprising the steps of:
storing the first operand in a first storage means and coupling the first operand to the AU in response to a first operand selection portion of an operating instruction;
storing the second operand in a second storage means and coupling the second operand to the AU in response to a second operand selection portion of the operating instruction;
storing a third operand in a third storage means and coupling the third operand to the arithmetic unit control in response to a third operand selection portion of the operating instruction;
using the third operand as an encoded arithmetic format signal; and
decoding the third operand to provide an arithmetic format control signal to the AU which selects the arithmetic format of the selected operations executed by the AU.

13. The method of claim 12 wherein said first, second and third operand selection portions of the operating instruction are substantially the same portion of the instruction.

* * * * *